United States Patent [19]

Torisu

[11] Patent Number: 5,093,395
[45] Date of Patent: Mar. 3, 1992

[54] FLAME RETARDANT POLYESTER ELASTOMER COMPOSITION

[75] Inventor: Shinji Torisu, Osaka, Japan

[73] Assignee: Sumitomo Electric Industries, Ltd., Osaka, Japan

[21] Appl. No.: 415,746

[22] Filed: Oct. 2, 1989

Related U.S. Application Data

[63] Continuation-in-part of Ser. No. 176,507, Apr. 1, 1988, abandoned.

[30] Foreign Application Priority Data

Apr. 1, 1987 [JP] Japan .................. 62-81768

[51] Int. Cl.$^5$ ............................................. C08K 5/34
[52] U.S. Cl. ........................................ 524/99; 524/87; 524/102; 524/258
[58] Field of Search ................ 524/99, 102, 87, 258

[56] References Cited

U.S. PATENT DOCUMENTS

| | | | |
|---|---|---|---|
| 2,268,419 | 12/1941 | Paul | 524/87 |
| 2,729,690 | 1/1956 | Bradley | 524/87 |
| 2,776,994 | 1/1957 | Wolfe et al. | 524/258 |
| 3,551,381 | 12/1970 | Stewart et al. | 524/258 |
| 3,629,110 | 12/1971 | Hunt | 524/258 |
| 3,850,881 | 11/1974 | Hoeschele | 524/99 |
| 3,896,078 | 7/1975 | Hoeschele | 524/87 |
| 3,944,552 | 3/1976 | Lawrence . | |
| 3,987,004 | 10/1976 | Georgoudis | 524/87 |
| 4,049,647 | 9/1977 | Holt et al. | 524/99 |
| 4,136,090 | 1/1979 | Hoeschele | 524/718 |
| 4,185,003 | 1/1980 | Hoeschele | 524/99 |
| 4,241,217 | 12/1980 | Kuczkowski | 560/152 |
| 4,269,720 | 5/1981 | Bartleson et al. | 252/50 |
| 4,524,165 | 6/1985 | Musser et al. | 524/99 |
| 4,525,504 | 6/1985 | Morris et al. | 524/291 |
| 4,612,393 | 9/1986 | Ravichandran et al. | 564/300 |
| 4,668,721 | 5/1987 | Seltzer et al. | 524/95 |
| 4,668,727 | 5/1987 | Ravichandran et al. | 524/239 |
| 4,673,700 | 1/1987 | Ravichandran et al. | 524/96 |
| 4,703,073 | 10/1987 | Winter et al. | 524/99 |
| 4,797,511 | 1/1989 | Capolupo et al. | 524/87 |
| 4,812,543 | 3/1989 | Matlack et al. | 526/281 |

Primary Examiner—Kriellion S. Morgan
Attorney, Agent, or Firm—Sughrue, Mion, Zinn, Macpeak & Seas

[57] ABSTRACT

A flame retardant polyester elastomer composition comprising a polyester elastomer, an amine antioxidant, and a hindered amine light stabilizer.

6 Claims, No Drawings

FLAME RETARDANT POLYESTER ELASTOMER COMPOSITION

This is a continuation-in-part of application Ser. No. 07/176,507, filed Apr. 1, 1988, now abandoned.

FIELD OF THE INVENTION

The present invention relates to a flame retardant polyester elastomer composition having improved anti-heat aging properties and electric properties.

BACKGROUND OF THE INVENTION

A polyester elastomer is a specific polymer having both chemical resistance and flexibility. Polyester elastomers are inferior in thermal resistance in comparison to fluorine rubber or the like and for this reason a fluorine rubber, which is expensive but can be used at a temperature of 150° C. or more, generally should be used for purposes under a high temperature of from 120° to 150° C.

It is well known in this field of art that a flammable polymer can be made flame retadant by adding thereto a flame retardant, and that the anti-heat deformation properties of a polymer can be improved by crosslinking using electron beam irradiation.

However, even if the polyester elastomer is made flame retardant and is crosslinked by the above procedures, its use under a high temperature for a long period of time is restricted, unless its anti-heat aging properties can be improved. That is, even if the elastomer is crosslinked, the polymer molecules are broken due to oxidation deterioration upon long time use at an elevated temperature, and thus the characteristics of the elastomer (e.g., the tensile strength) is deteriorated.

It has been proposed to improve the anti-heat aging properties of a flame retardant polyester elastomer by adding a high molecular weight hindered phenol type antioxidant, a chlorine flame retardant, and a polyfunctional monomer to a polyester elastomer which is followed by crosslinking using electron beam irradiation (as described, e.g., in Japanese Patent Application (OPI) No. 163953/86) (the term "OPI" used herein means a published unexamined Japanese Patent Application). However, this method still has the disadvantage that the tensile strength and the electric properties, particularly the volume resistivity, of the resulting polyester elastomer are not satisfactory.

As an example of a polyester elastomer containing both an antioxidant and a light stabilizer, it has been proposed in U.S. Pat. No. 4,524,165 to add a hindered phenol type antioxidant and a hindered amine type light stabilizer to a polyester elastomer so as to improve its weather resistance. However, the thermal resistance and the electric properties cannot be improved by this method.

SUMMARY OF THE INVENTION

An object of the present invention is to provide a flame retardant polyester elastomer having excellent antiheat aging properties and electric properties in addition to flame retardancy and good anti-heat deformation properties.

Other objects of the present invention will be apparent from the following description.

The present inventor has conducted extensive studies, and as a result has discovered that the above objects of the present invention can be attained by a flame retardant polyester elastomer composition comprising a polyester elastomer, an amine antioxidant, and a hindered amine light stabilizer.

DETAILED DESCRIPTION OF THE INVENTION

The present inventor has found that a polyester elastomer composition excellent in thermal resistance and electric properties in addition to the flame retardancy can be obtained by adding an amine type antioxidant and a hindered amine type light stabilizer to a polyester elastomer. Moreover, the present inventor has found that the anti-heat aging properties and electric properties can be effectively improved by using a hindered amine light stabilizer containing the structure represented by formula (I):

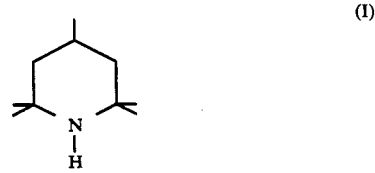

in comparison to those containing the structure;

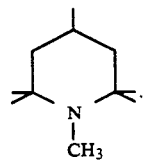

A hindered amine type light stabilizer particularly effective to improve the anti-heat aging properties and electric properties contains a structure represented by formula (II):

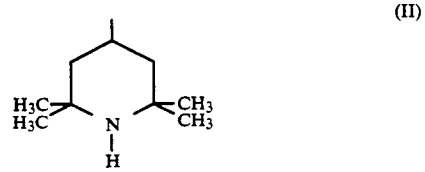

The polyester elastomer used in the present invention is an $(AB)_n$ type copolymer such as a segmented polyester comprising hard segments of a terephthalic acid crystalline polyester and soft segments of an aliphatic polyether (as described, e.g., in Japanese Patent Publication No. 29626/85).

The amine antioxidant used in the present invention is preferably those having no or less staining properties, such as a keto-amine condensed product and an aromatic amine, and most preferred examples thereof include poly(2,2,4-trimethyl-1,2-dihydroquinoline) and an aromatic amine.

In the present invention, various additives other than the above amine antioxidant and hindered amine light stabilizer may be added, including, e.g., a polyfunctional monomer for improving the crosslinking effect (hereinafter referred to as a "crosslinking agent") upon irradiating with an electron beam or the like (e.g., triallyl isocyanurate and trimethylolpropane trimethacrylate), preferred amount thereof is from 1 to 10 parts by weight, and more preferably from 1 to 5 parts by weight; a flame retardant for attaining flame retardancy (e.g., a bromine type or chlorine type flame retardant), preferred amount thereof is from 10 to 40 parts by weight, and more preferably from 10 to 20 parts by weight; a flame retarding assistant (e.g., antimony trioxide (preferred amount thereof is from 5 to 20 parts by weight, and more preferably from 10 to 20 parts by weight) and zinc borate (preferred amount thereof is from 5 to 20 parts by weight, and more preferably from 5 to 10 parts by weight)); a coloring agent (e.g., carbon), preferred amount thereof is about 2 parts by weight; and the like. The preferred amounts of the various additives referred above are indicated in terms of the amount per 100 parts by weight of the polyester elastomer.

In the flame retardant polyester elastomer of the present invention, the anti-heat aging properties can be improved by increasing the amount of the amine type antioxidant added. However the volume resistivities of the polyester elastomer before and after electron beam crosslinking are deteriorated by this procedure. In order to avoid this problem, in the flame retardant polyester elastomer of the present invention, the volume resistivity is improved by adding the hindered amine light stabilizer which is conventionally used for improving the weather resistance of polyurethanes and polypropyrenes. Furthermore, the amount of the antioxidant can be reduced by the use of the hindered amine type light stabilizer so as to prevent crosslinking inhibition due to the antioxidant, and environment pollution.

Many of the commercially available hindered amine light stabilizers contain a structure represented by formula (III):

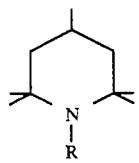
(III)

wherein R represents H or CH$_3$. Among these compounds, the present inventor has found that those wherein R represents H are more effective in the present invention.

The amount of the amine type antioxidant is preferably from 1 to 5 parts by weight, more preferably from 2 to 3 parts by weight, per 100 parts by weight of the polyester elastomer. If it is less than 1 part by weight, the anti-heat aging properties are not improved effectively. Even if it is more than 5 parts by weight, further improvement in anti-heat aging properties is not obtained.

The amount of the hindered amine type light stabilizer is preferably from 0.5 to 5 parts by weight, more preferably from 1 to 2 parts by weight, per 100 parts by weight of the polyester elastomer. If it is less than 0.5 part by weight, the electric properties are not improved effectively. By using the hindered amine light stabilizer in an amount of 10 to 20 or the like parts by weight, the anti-heat aging property can be greatly improved so as to reduce the amount of the antioxidant. However, in view of the cost of the final products, the amount of the hindered amine type light stabilizer is preferably from 0.5 to 5 parts by weight.

The flame retardant polyester elastomer composition of the present invention can be prepared, for example, by weighing the ingredients, and mixing and kneading in rolls or a biaxial extruder at 130° to 210° C. The molding may be carried out by using an extruder at 130° to 210° C. followed by being crosslinked with electrom beam. When the composition is required to have heat shrinkability, it may be inflated after crosslinking.

The present invention will be explained in more detail referring to the following examples, but the present invention is not to be construed as being limited thereto. Unless otherwise indicated, all parts, percents, and ratios are by weight.

EXAMPLES 1 TO 5 AND COMPARATIVE EXAMPLES 1 TO 5

Polyester elastomer sheets of a 1 mm thickness having formulations described in Table 1 below were prepared by mixing and kneading the ingredients in 6-inch rolls having a surface temperature of 100° to 130° C., and then press-molded at 140° C. to a sheet, followed by being crosslinked by irradiating with an electron beam to a total dose of 20 Mrad. Each sample (Examples 1 to 5 and Comparative Examples 1 to 5) was measured for tensile strength and ultimate elongation allowed to stand at 160° C. for 7 days, and the volume resistivities before and after the electron beam irradiation were determined. The measurements of the tensile strength and the ultimate elongation were carried out according to ASTM D638 at a tensile rate of 100 mm/min, and the measurement of the volume resistivity was carried out according to ASTM D876. The results obtained are shown in Table 2.

TABLE 1

| Ingredient | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Polyester elastomer*1 | 100 | 100 | 100 | 100 | 100 | 100 | 100 | 100 | 100 | 100 |
| Antioxidant*2 | 2 | 2 | 2 | — | — | 3 | — | 2 | 2 | — |
| Antioxidant*3 | — | — | — | 1 | 1 | — | 2 | — | — | — |
| Antioxidant*4 | — | — | — | — | — | — | — | — | — | 3 |
| Light stabilizer*5 | 1 | — | — | — | — | — | — | — | — | — |
| Light stabilizer*6 | — | 1 | — | — | 1 | — | — | — | — | — |
| Light stabilizer*7 | — | — | 1 | 0.5 | — | — | — | — | — | — |
| Light stabilizer*8 | — | — | — | — | — | — | — | 1 | — | — |
| Light stabilizer*9 | — | — | — | — | — | — | — | — | 1 | — |
| Flame retardant*10 | 20 | 20 | 20 | 20 | — | 20 | 20 | 20 | 20 | — |
| Dechlorane Plus 25*11 | — | — | — | — | 20 | — | — | — | — | 20 |
| Sb$_2$O$_3$ | 20 | 20 | 20 | 20 | 20 | 20 | 20 | 20 | 20 | 5 |
| Trimethylisocyanurate | — | — | — | — | 5 | — | — | — | — | 5 |
| Trimethyrolpropane trimethacrylate | 5 | 5 | 5 | 5 | — | 5 | 5 | 5 | 5 | — |

TABLE 2

| Characteristics | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Tensile strength after 7 days at 160° C. (kg/mm$^2$) | 1.50 | 1.51 | 1.55 | 1.10 | 1.03 | 1.35 | 1.26 | 1.39 | 1.46 | 0.96 |
| Ultimate elongation after 7 days at 160° C. (%) | 460 | 420 | 460 | 370 | 320 | 410 | 560 | 410 | 440 | 350 |
| Volume resistivity before irradiation ($\times 10^{10}$ Ωcm) | 500 | 800 | 200 | 400 | 600 | 20 | 30 | 50 | 90 | 600 |
| Volume resistivity after irradiation ($\times 10^{10}$ Ωcm) | 200 | 200 | 400 | 400 | 100 | 8 | 2 | 70 | 9 | 10 |

Note:
*[1] Melt index (190° C., 2,160 g): 14
Hardness (Shore D): 32
Density: 1.17 g/cm$^3$
*[2] Poly(2,2,4-trimethyl-1,2-dihydroquinoline)
*[3] Naugard 445 (trademark of a substituted diphenyl amine produced by Uniroyal Co., Ltd.)
*[4] N,N'-hexamethylenebis(3,5-di-tert-butyl-4-hydroxy-hydrocinnamamide
*[5] Condensate of 1,2,3,4-butanetetracarboxylic acid, 2,2,6,6-tetramethyl-4-piperidinol, and β,β,β',β'-tetramethyl-3,9-(2,4,8,10-tetraoxaspiro[5,5]undecane)diethanol
*[6] Poly(((6-(1,1,3,3-tetramethylbutyl)imino-1,3,5-triazine-2,4-diyl)(2,2,6,6-tetramethyl-4-piperidil)imino)hexamethylene((2,2,6,6-tetra-methyl-4-piperidil)imino))
*[7] Tetrakis(2,2,6,6-tetramethyl-4-piperidil)1,2,3,4-butanetetracarboxylate
*[8] Condensate of 1,2,3,4-butanetetracarboxylic acid, 1,2,2,6,6-pentamethyl-4-piperidinol, and β,β,β',β'-tetramethyl-3,9-(2,4,8,10-tetraoxaspiro-[5,5]undecane)diethanol
*[9] Condensate of 1,2,3,4-butanetetracarboxylic acid, 2,2,6,6-tetramethyl-4-piperidinol(N-methyl), and tridecyl alcohol
*[10] Decabromodiphenyl oxide
*[11] Trademark of a cyclic organic compound produced by Hooker Chemicals & Plastics Co. (chlorine content: 65%; average particle size: 2 to 5 μm)

From the results shown in Table 2, it can be understood that the samples of Examples 1 to 5 according to the present invention had a tensile strength after 7 days at 160° C. of 1.00 kg/mm$^2$ or more and volume resistivities both before and after irradiation of at least $1 \times 10^{12}$ Ωcm.

The present invention thus provides a flame retardant polyester elastomer composition having both improved heat-aging resistance and improved electric properties.

While the invention has been described in detail and with reference to specific examples thereof, it will be apparent to one skilled in the art that various changes and modifications can be made therein without departing from the spirit and scope thereof.

What is claimed is:

1. A flame retardant polyester elastomer composition comprising a polyester elastomer, an amine antioxidant, and a hindered amine light stabilizer, wherein said amine antioxidant is selected from the group consisting of 4,4'-bis(2,2'-dimethylbenzyl)diphenylamine and poly(2,2,4-trimethyl-1,2-dihydroquinoline, and said hindered amine light stabilizer is selected from the group consisting of (a) a condensate of 1,2,3,4-butanetetracarboxylic acid, 2,2,6,6-tetramethyl-4-piperidinol, and β, β, β', β'-tetramethyl-3,9-(2,4,8,10-tetraoxaspiro[5,5]undecane)diethanol, (b) poly(((6-(1,1,3,3-tetramethylbutyl)imino-1,3,5-triazine-2,4-diyl) (2,2,6,6-tetramethyl-4-piperidil)imino)hexamethylene((2,2,6,6-tetramethyl-4-piperidil)imino)), and (c) tetrakis(2,2,6,6-tetramethyl-4-piperidil)1,2,3,4-butanetetracarboxylate.

2. A flange retardant polyester elastomer composition as claimed in claim 1, wherein the amount of said amine antioxidant is from 1 to 5 parts by weight per 100 parts by weight of said polyester elastomer and the amount of said hindered amine light stabilizer is from 0.5 to 5 parts by weight per 100 parts by weight of said polyester elastomer.

3. A flame retardant polyester elastomer composition as claimed in claim 2, wherein the amount of said amine antioxidant is from 2 to 3 parts by weight per 100 parts by weight of said polyester elastomer and the amount of said hindered amine light stabilizer is from 1 to 2 parts by weight per 100 parts by weight of said polyester elastomer.

4. A flame retardant polyester elastomer composition as claimed in claim 1, wherein said polyester elastomer is an (AB)$_n$ type copolymer.

5. A flame retardant polyester elastomer composition as claimed in claim 4, wherein said polyester elastomer comprises hard segments comprising a terephthalic acid crystalline polyester, and soft segments comprising an aliphatic polyester.

6. A flame retardant polyester elastomer composition as claimed in claim 1, further comprising at least one of a crosslinking agent, a flame retardant, a flame retarding assistant, and a coloring agent.

* * * * *